(12) United States Patent
Murugesan et al.

(10) Patent No.: US 7,756,886 B1
(45) Date of Patent: Jul. 13, 2010

(54) FILTERED LIST ASSISTED ELEMENT SELECTION

(75) Inventors: Venkatesan Murugesan, San Jose, CA (US); Brian Morearty, San Carlos, CA (US); Gerald Huff, Berkeley, CA (US)

(73) Assignee: Intuit Inc., Mountain View, CA (US)

( * ) Notice: Subject to any disclaimer, the term of this patent is extended or adjusted under 35 U.S.C. 154(b) by 756 days.

(21) Appl. No.: 11/218,769

(22) Filed: Sep. 2, 2005

(51) Int. Cl.
*G06F 17/30* (2006.01)
(52) U.S. Cl. ......................... 707/767; 707/754
(58) Field of Classification Search ........................ None
See application file for complete search history.

(56) References Cited

U.S. PATENT DOCUMENTS

| | | | |
|---|---|---|---|
| 6,366,910 B1 * | 4/2002 | Rajaraman et al. ............. | 707/5 |
| 6,564,213 B1 * | 5/2003 | Ortega et al. ................... | 707/5 |
| 2003/0120737 A1 * | 6/2003 | Lytle et al. .................. | 709/206 |
| 2006/0173821 A1 * | 8/2006 | Hennum et al. ................ | 707/3 |
| 2006/0248078 A1 * | 11/2006 | Gross et al. .................... | 707/5 |
| 2008/0065617 A1 * | 3/2008 | Burke et al. .................... | 707/5 |

OTHER PUBLICATIONS ccRecon Help File (selected pages) published by Synergration (date unknown) [online] [retrieved on Dec. 8, 2005].

* cited by examiner

*Primary Examiner*—Don Wong
*Assistant Examiner*—Belinda Xue
(74) *Attorney, Agent, or Firm*—Osha · Liang LLP

(57) ABSTRACT

A system displays a filtered list of elements in response to receiving user input of a desired string associated with a list of elements. The system includes a user interface control, such as an edit control, for receiving the input, and determines whether elements matching the desired string exist in the list of elements. The system provides the ability to search internal strings of an element and various levels of a hierarchical list. If no matching elements exist, the system displays the entire list and provides an option to add a new element to the list.

25 Claims, 8 Drawing Sheets

FILTERED LIST ASSISTED ELEMENT SELECTION

BACKGROUND

The present invention relates to selection of elements from lists aided by a filtering mechanism. In various contexts of computer software, users perform data entry by selecting elements from lists. One of the most common forms that such lists take is a drop-down list. A drop-down list is a list that opens when a dropdown button is clicked on and stays open until the user selects a list item or clicks elsewhere in the user interface.

In response to increased use of lists, various tools have been created in an attempt to refine their use. Existing tools require the user to find a desired element in the context of the complete list of elements. In especially long lists, finding a single element is very time-intensive and finding elements in lists becomes increasingly difficult as the length of the list increases. Some tools highlight a list element when the beginning (leftmost portion) of the list element matches the user's data entry. However, if the highlighted element is not the element desired by the user, the user is required to scroll the entire list of elements. Thus, when using these tools, the user must ignore a large amount of visual clutter caused by the desired element being surrounded by elements in which the user has no interest.

Some tools require the user to know specific information about the way the list is structured in addition to precise details about the desired element in order to find it in the list. For example, for a list of names in <last name, first name> format, a user of existing tools is required to know that the list is organized by the leftmost string of the list element only, and thus is required to know the last name of the desired person. Some tools also require the user, for list elements that are sub-elements in a hierarchy, to know the highest-level list item in the hierarchy.

SUMMARY

In various embodiments, the present invention provides methods and systems for selecting an element from a list, using a filtering mechanism. The system includes a user interface control, such as an edit control, for receiving input of a string, e.g., as a portion of a desired element, in a list of elements. The system determines whether elements matching the desired string exist in the list of elements, and displays, e.g., as a drop-down, any matches in a filtered list of elements. The filtered list of elements is a portion of the complete list of elements including only the matches to the input string received. The user then can find the desired element in a smaller, filtered list.

The system provides, for a list of hierarchical families, the ability to search elements at every level of the hierarchy. The resulting filtered list retains the hierarchy, displaying the matched element, as well as the elements above and below the matched element in the hierarchy.

For elements including multiple strings, the system attempts to match each string within the element, including internal (non-leftmost) strings. The resulting filtered list includes elements with strings matching any portion of the element.

If no elements matching the desired string exist in the list of elements, the system displays the entire list to the user instead. A user can add a new element to the list of elements via the user interface, with limited or more complete information about the element. The list of elements is updated automatically to reflect such changes.

The description in the specification is not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Figure 1:
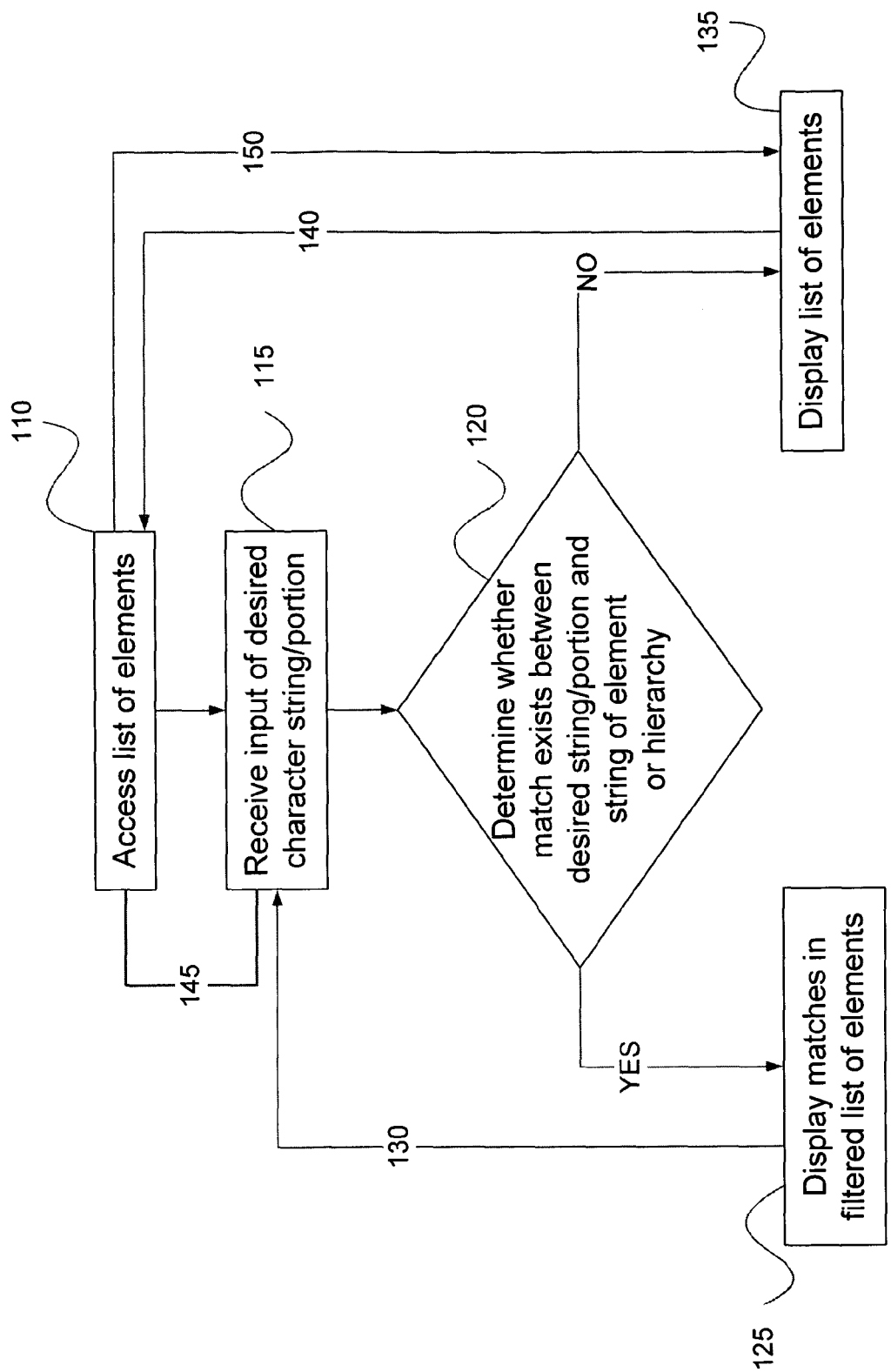
FIG. 1 is a flowchart illustrating one embodiment of a method for selecting an element from a list according to the present invention.

FIG. 1 is a flowchart illustrating one embodiment of a method for selecting an element from a list according to the present invention. In one embodiment, selecting an element from a list is built into the workflow for personal or commercial financial management. In other embodiments, the method is built into the workflow for other applications for which it is advantageous to filter a long list, for example, geographical software associating city names with their respective states.

As a preliminary step, the system first accesses a list of stored elements 110 according to one embodiment. The list of elements may be stored in a database or other data store. The elements include one or more strings of characters, including letters, numerals, or other symbols. The list of elements is stored in a hierarchical format in one embodiment, with related higher-level elements and lower level elements connected in element families, and contains multiple columns. In other embodiments, the list is non-hierarchical or takes other forms. In one embodiment, the list of elements is indexed and searchable. The list of elements is ordered in one embodiment, for example, alphabetically, chronologically, geographically, or in ascending or descending numerical order, etc., as appropriate to the context and desired functionality. In one embodiment, the list of elements is created from an array of pointers to the stored list of elements.

A user begins the process of selecting an element from the list by entering a first portion of a desired character string, and the system receives the user input 115 of the first portion of the desired character string. In one embodiment, the input is received within a user interface via a control including an area for receiving character input, for example, by typing on a keyboard. A first portion of a desired character string, as used herein, may be a single character, multiple characters, or multiple strings. A software portion, such as an input module, is one means for receiving input of a first portion of a desired character string, as recited in the claims.

Once one or more characters have been input, the system in one embodiment determines whether there are any matches between the first portion of the desired character string and a string of an element or hierarchy 120. The match can be a complete match or a partial match. For example, for a desired string "pen," matching element strings include "pen" (complete), as well as "pencils" and "pending" (partial). The determination 120 includes in one embodiment searching multiple columns and multiple levels of a multiple column, hierarchical list of elements. In addition, for elements including multiple strings, the match is attempted for each string within the element according to one embodiment, including internal (non-leftmost) strings. Thus, for the desired string "pen" from above, "spend," "expensive," and "red pens" also would be matches, as each includes the internal string match "pen." Providing the ability to search internal (non-left) strings within elements allows the user to easily find desired information with limited knowledge. For example, for a list organized by <last name, first name>, the ability to search internal strings allows the user to find a desired list element even if the user knows only the first name, i.e., a non-left string. In one embodiment, the system checks for matches by, each time a control of a user interface passes the desired character string, creating (and later destroying) a temporary array of pointers to selected strings and elements within a stored list of elements.

A software portion, such as a match module, is one means for determining whether elements with one or more strings matching a first portion of a desired character string exist in a list of elements or in a hierarchy of element levels of a family, as recited in the claims.

If at least one match occurs, the system displays a filtered list of elements 125, e.g., as a drop-down, to the user according to one embodiment. The filtered list of elements is a portion of the list of elements including only the matches to the input string received. In one embodiment, the filtered list automatically displays to the user; a preference is available to change to a manual display. This aspect of the present invention is advantageous over systems that display an unfiltered list of elements, for example marking a matching element, because the user gets the information he needs, without the need to ignore visual clutter caused by having the desired information displayed surrounded by information in which the user has no interest.

The filtered list includes in one embodiment, matches at different levels in various family hierarchies. For example, if the desired character string input is "co" and one family hierarchy with highest-element "color" and lower-level elements "red, yellow, blue" and a second family hierarchy with highest-level element "shape" and lower-level elements "square, round, conical," the system would find matches for both "color" (highest level) and "conical" (lower level under "shape"). In one embodiment, all elements levels are displayed for matches in the filtered list that have a hierarchical family. For the previous example, "red, yellow, blue" would be displayed below "color," and "shape" would be displayed above "conical." A preference to turn off display of all levels of a hierarchy exists in a dialog box in one embodiment. The ability to search various levels of a hierarchy of list items, and filter relevant choices for display in the context of a list box reduces the time and effort a user would otherwise expend in manually traversing list box choices through various hierarchical levels.

The filtered list of elements displays immediately in one embodiment. In another embodiment, the filtered list of elements displays after a short delay when the user stops typing or pauses between letters for a predetermined period of time, i.e., a delay short enough to be undetectable by the user. The determining may be delayed, for example, to ascertain whether additional input will be received. The delay is dependent on the size of the list of elements in one embodiment. For example, the following sliding scale may be used: for list size up to 2,000 elements, display without delay; for list size 2,001-4,000 elements, wait ¼ second for list size 4,001-10,000, wait ½ second; for list size greater than 10,000, wait 1 second. In other embodiments, different delay schemes are used. In addition, the delay is used to run various background processes in one embodiment. This aspect of the present invention is advantageous because it maximizes efficiency, as longer lists take longer to filter.

Various actions are taken on the filtered list displayed in the several embodiments. The filtered list of elements in one embodiment is ordered, for example, alphabetically by the highest-level element. In other embodiments, other ordering schemes are used as appropriate for the desired result. In one embodiment, the "first" element in the order is emphasized, for example by highlighting, and is populated into the string input area. In the example of ordering alphabetically by the highest-level element, the highest-level element that is alphabetically first is emphasized. In other embodiments, other methods of emphasis are used, such as color-blocking, checkmarking, off-setting, and other methods as appropriate to the context. In addition, the system is configured to receive user input to scroll through the filtered list in one embodiment, for example by using up and down cursor keys.

In one embodiment, the filtered list of elements is refined 130 as the input changes. If a change in input is received 115, for example if a second portion of a desired string is entered, the system again determines if there is a match 120 including the second portion of the input string, and if so, displays a refined filtered list of elements 125. In one embodiment, the cycle starts over using only the altered input string (e.g., first portion and second portion), looks for matches to the altered string in the list of elements, and updates the filtered list. In another embodiment, the cycle repeats, replacing the complete list of elements with the filtered list of elements, further refining the filtered list of elements resulting from the first portion match to include only elements that also include a second portion match. Once the list has been narrowed, the user can select the element filled in the string input area if it is the desired element, e.g., by tabbing out or clicking outside the input area, or can select the desired element from the filtered list, e.g., by clicking or cursoring down. The system receives the input selecting the element, but does not change the filtering criteria (i.e., does not refine the filtered list).

A software portion, such as a display module, is one means for displaying elements with one or more strings matching a first portion of a desired character string, and for displaying a hierarchy of element levels for families including elements with one or more strings matching the first portion of the desired character string, as recited in the claims.

If it is determined that no match is found for the input string, the system displays the complete (unfiltered) list of elements 135 in one embodiment. In addition, the list of elements includes an <add new> element in the list of elements displayed in one embodiment. Receiving selection of <add new>, the system opens a new screen to allow the user to enter new element information, which the system will automatically add 140 to the list of elements. In another embodiment, by tabbing out of, or otherwise exiting the input string area while populated by a desired character string with no match, the system opens a dialog box, allowing the user to quickly add just the element (but no other information), which the system adds 145 to the list of elements. Alternatively, the dialog box gives the user the option of entering more complete information via a different screen.

In one embodiment, the system retains the ability to receive input to display the list of elements, e.g., as a drop-down, without filtering 150. For example, a drop-down button may be used for this purpose when the input string area is blank or filled with an exact match in one embodiment.

Figure 2:
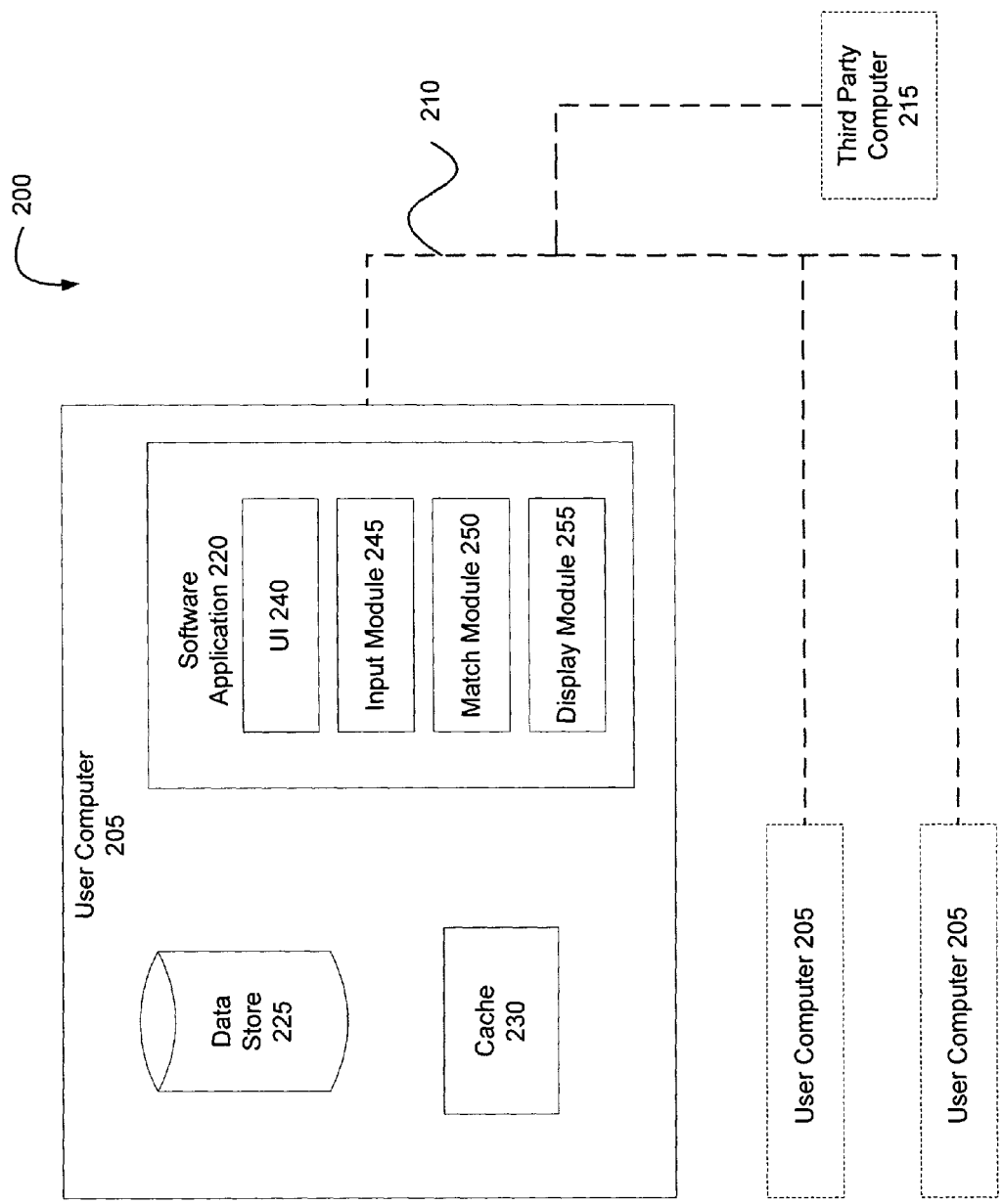
FIG. 2 is a block diagram illustrating the architecture of one embodiment of a system useful for supporting a software application for selecting an element from a list of elements.

FIG. 2 is a block diagram illustrating the architecture of one embodiment of a system 200 useful for supporting a software application 220 for selecting an element from a list of elements. In such a system 200, there is provided at least one user computer 205, which may be a stand-alone device or may be communicatively coupled to a network 210 and/or one or more third party computers 215, as indicated by dotted lines.

The user computer 205 is of conventional design, and includes a processor, an addressable memory, and other conventional features (not illustrated) such as a display, local memory, input/output ports, and a network interface. In other embodiments one or more of the components of the user computer 205 may be located remotely and accessed via a network, e.g., 210. The network interface and a network communication protocol provide access to a network 210 and other computers, such as other user computers 205 or third party computers 215, along with access to the Internet, via a TCP/IP type connection, or to other network embodiments, such as a LAN, a WAN, a MAN, a wired or wireless network, a private network, a virtual private network, or other networks. In various embodiments the user computer 205 may be implemented on a computer running a Microsoft operating system, Mac OS, various flavors of Linux, UNIX, Palm OS, and/or other operating systems.

The third party computers 215, if present, also may be computer systems, similar to the user computer described above. For example, one embodiment of a third party computer 215 is a financial institution computer system, which provides transactions processing and clearing functionality for user software. The financial institution could be a securities brokerage company, a bank or credit union, a credit card company, or financial institutions. In this embodiment, the user software application 220 described herein may be a financial management software package capable of communicating with the financial institution computer system to access information from pre-existing user accounts (e.g., obtain account balances to determine available funds), and provide payment instructions for making payments to vendors.

The user computer 205 includes a software application 220, data store 225, and data cache 230. The software application 220 is comprised of a number of executable code portions and data files. These include code for creating and supporting a user interface 240 according to one embodiment of the present invention, as well as for supporting selection of an element from a list of elements 245-255: In other embodiments, the software application 220 can also be implemented as a stand-alone application outside of a financial management software package.

The software application 220 is responsible for orchestrating the processes performed according to the methods of the present invention. The software application 220 includes an input module 245, a match module 250, and a display module 255. FIG. 2C is a block diagram showing seal device software 250 according to one embodiment of the present invention.

The input module 245 enables the system 200 to receive user input in various forms according to one embodiment, including initial and altered input of a desired character string, selecting an element from a list, selection of input to add a new element to a list, and input to display a complete (unfiltered) list of elements. The input module 245 is one means for receiving input of a first portion of a desired character string, as recited in the claims.

The match module 250 enables the system 200 to match up lists and input according to one embodiment, including accessing a list of stored elements from the data store 225 or cache 230, determining whether matches occur between a desired character string and a list of elements, and creating a temporary array of pointers to selected strings and elements within stored lists of elements. In one embodiment, the match module 250 passes a desired character string and dynamically creates, and later destroys, a temporary array of pointers to a stored editable list. The match module 250 is one means for determining whether elements with one or more strings matching a first portion of a desired character string exist in a list of elements or in a hierarchy of element levels of a family, as recited in the claims.

The display module 255 enables the system 200 to display elements to a user, including displaying filtered and unfiltered lists of elements, automatically or manually displaying a list to a user, displaying immediately or delaying display, ordering and emphasizing elements in a displayed list, receiving input to scroll through a list of elements, and displaying a refined list of elements. The display module 255 is one means for displaying elements with one or more strings matching a first portion of a desired character string and for displaying a hierarchy of element levels for families including elements with one or more strings matching the first portion of the desired character string, as recited in the claims.

The above software portions 245-255 need not be discrete software modules. The software configuration shown is meant only by way of example; other configurations are contemplated by and within the scope of the present invention.

The software application 220 may be provided to the user computer 205 on a computer readable media, such as a CD-ROM, diskette, or by electronic communication over the network 210 from one of the third party computers 215 or other distributors of software, for installation and execution thereon. Alternatively, the software application 220, data store 225, and data cache 230 can be hosted on a server computer, and accessed over the network 210 by the user, using for example a browser interface to the software application 220.

The data store 225 may be a relational database or any other type of database that stores the data used by the software application 220, for example account information in the financial management application embodiment referenced above. The data store 225 may be accessible by the software application 220 through the user interface 240. Some data from the data store 225 may be added to the data cache 230 upon initialization of the software application 220. The software application 220 and the data store 225 may be stored and operated on a single computer or on separate computer systems communicating with each other through a network 210.

The data cache 230 is a standard cache of small, fast memory holding recently accessed data. The data cache 230 may include, for example, one or more lists of elements according to one embodiment of the present invention.

One skilled in the art will recognize that the system architecture illustrated in FIG. 2 is merely exemplary, and that the invention may be practiced and implemented using many other architectures and environments.

User Interface Control

Figure 3A:
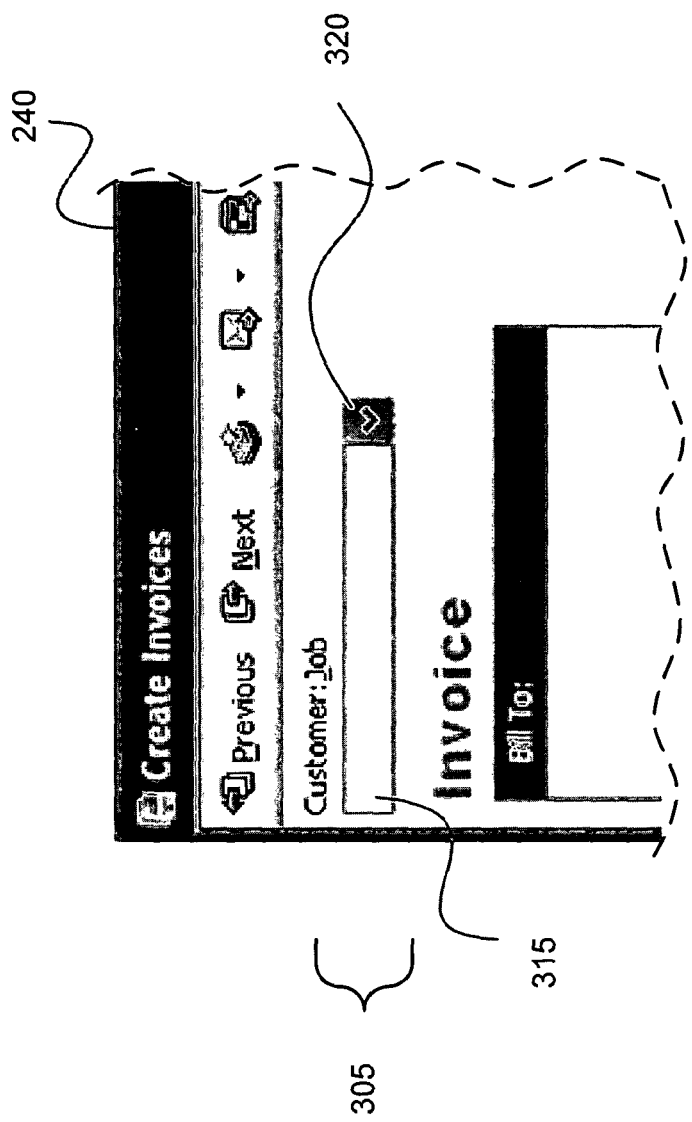
FIG. 3A illustrates one embodiment of a control of a user interface for selecting an element from a list according to the present invention.

In the embodiment shown in FIGS. 3A-3E, the control 305 is within a user interface 240 of a financial management software application, a portion of which is shown in FIG. 3A. In other embodiments, controls 305 are within user interfaces 240 associated with other types of applications for which the ability to filter a list is advantageous. For example, FIG. 3F shows a control 305 with a (truncated) filtered list 350 including cities and their respective states beginning with the input string "Paris," as shown in the input string area 315. The control 305 is one means for receiving input of a first portion of a desired character string, as recited in the claims.

FIG. 3A illustrates one embodiment of a control 305 of a user interface 240 for selecting an element from a list according to the present invention. The control 305 is configured for displaying a list of elements 325, receiving input to filter the list of elements 325, and displaying a filtered list of elements 350 as described in conjunction with FIG. 1. The control 305 includes a string input area 315 and a dropdown button 320. The string input area 315 is configured to receive character input from a user of the control 305, for example, by typing on a keyboard. Clicking the dropdown button 320 causes the list of elements 325 to display.

Figure 3B:
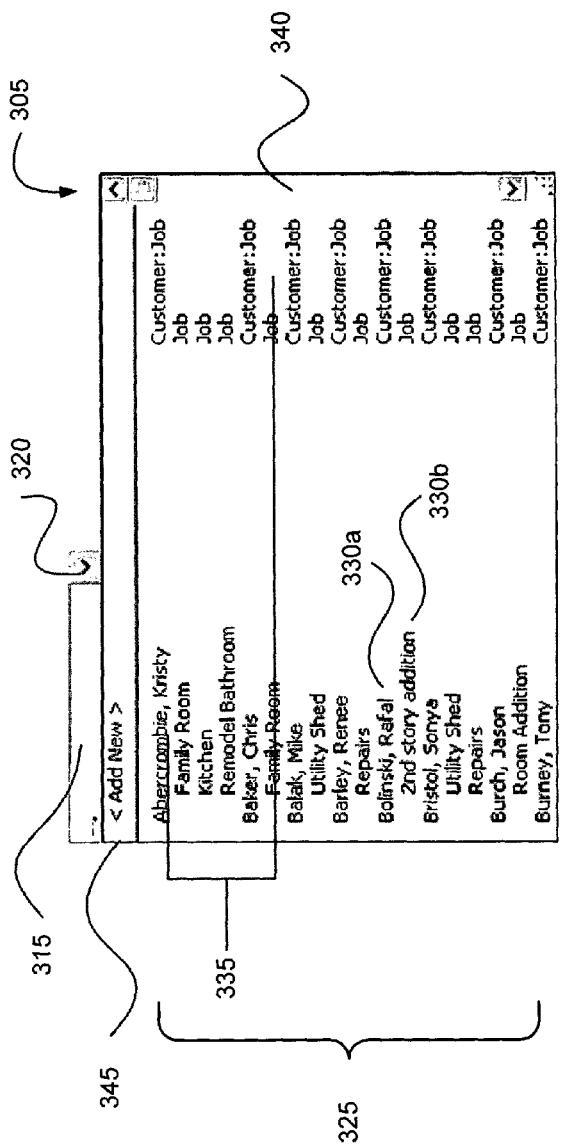
FIG. 3B illustrates one embodiment of the control of FIG. 3A displaying a list of elements according to the present invention.

FIG. 3B illustrates one embodiment of the control 305 of FIG. 3A displaying a list of elements 325. The list of elements 325 in one embodiment is a complete (unfiltered) list including various elements 330 in one or more columns 335. The list of elements 325 includes a hierarchy of elements 330, for example including higher-level elements 330a and lower-level elements 330b (or sub-elements). In one embodiment, the list of elements 325 is ordered alphabetically as shown. In addition, the list of elements 325 includes a scroll bar 340 in this embodiment, to assist the user in scanning the list of elements. The control in this embodiment includes an add element selector 345 that allows the user to add a new element 330 to the list of elements 325.

Figure 3C:
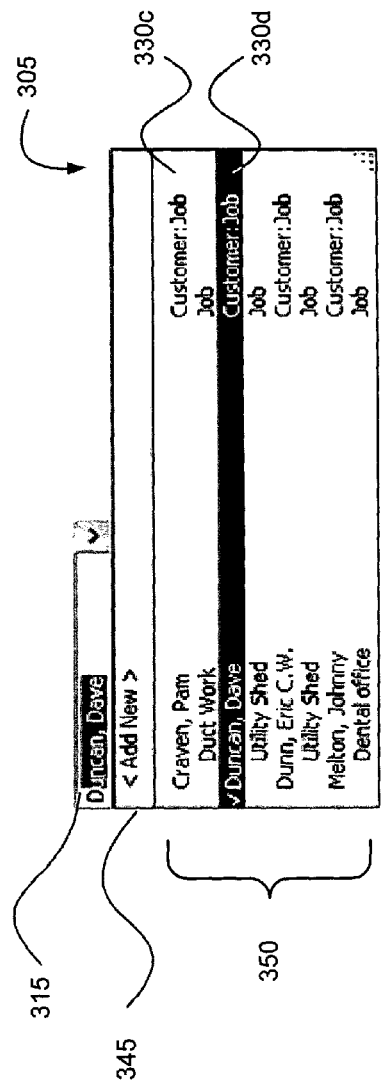
FIG. 3C-3F illustrate various embodiments of the control of FIG. 3A displaying filtered lists of elements according to the present invention.
Figure 3D:
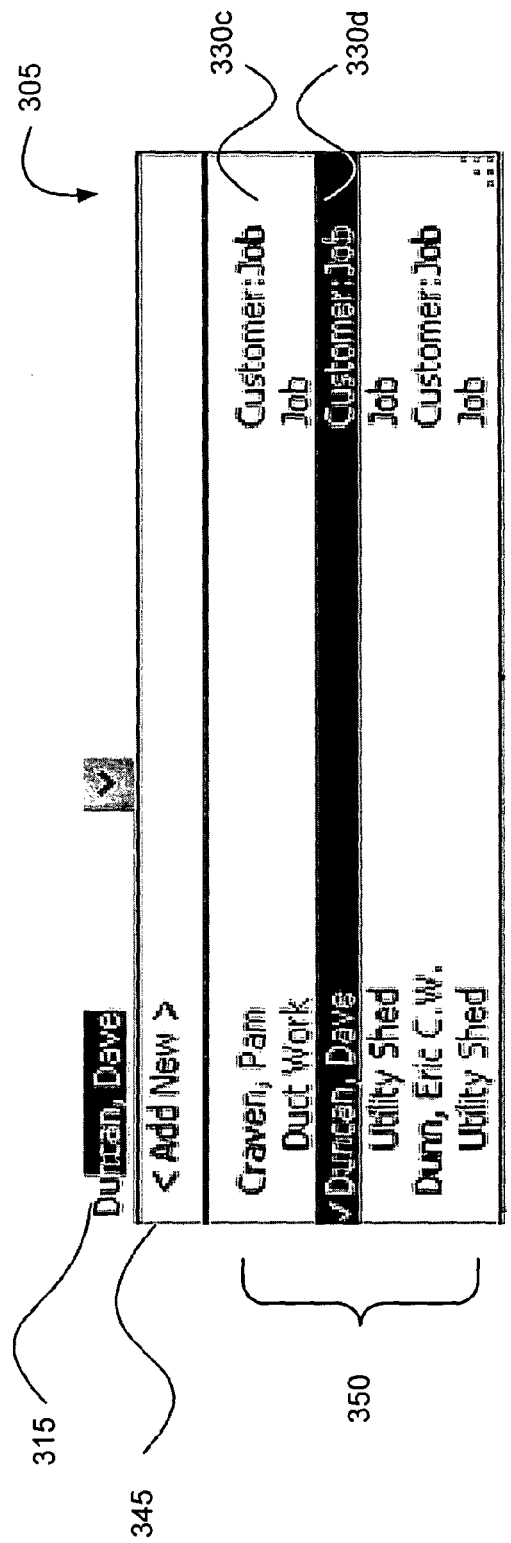

FIG. 3C illustrates one embodiment of the control 305 of FIG. 3A displaying a filtered list of elements 350. The filtered list of elements 350 in one embodiment is a portion of the list of elements 325 including only matches to the string entered by the user in the string input area 315. The filtered list of elements 350 in this embodiment includes a hierarchy of higher- and lower-level elements 330 as described above. In this embodiment, the filtered list shows matching strings in the highest level element, e.g., "D" for element "Duncan, Dave" 330d, and for lower level elements, e.g., "D" for element "Duct Work" 330c, under Craven, Pam. An add element selector 345 is displayed with the filtered list of elements 350 as well. In the example depicted, the filtered list of elements 350 is in alphabetical order by the highest-level element 330. In this example, the first element match "Duncan, Dave" 330d is emphasized by highlighting and a check mark, and is filled into the string input area 315.

The filtered list of elements 350 is one means for displaying elements with one or more strings matching a first portion of a desired character string and for displaying a hierarchy of element levels for families including elements with one or more strings matching the first portion of the desired character string, as recited in the claims.

Workflow

The workflow of selecting an element 330 from a list of elements 325 will now be described from the user perspective in terms of the control 305 as depicted in FIGS. 3A-3E and 4A-4B. The several figures are presented as screen shots depicting examples of the user interface 240 as it might appear on a display screen or other output device. The particular screen layouts, appearance, and terminology as depicted and described herein, are intended to be illustrative and exemplary, and in no way limit the scope of the invention as claimed.

The user begins with the blank control 305, as shown in FIG. 3A. The control 305 is associated with a list of elements 325, which the system previously has accessed 110 as described in conjunction with FIG. 1. In this example, the user wants to enter "Duct Work" for a customer whose name he cannot remember. As the user inputs a character string into the string input area 315, a filtered list of elements 350 automatically displays to the user, assuming at least one match between the string and the list of elements 350.

Note that in this embodiment, higher and lower level elements 330 are included in the filtered list 350, so long as one element 330 in the hierarchy matches the input string. Thus, the filtered list of elements 350 includes elements 330 with "D" in any of the levels of the hierarchy. For example, "Craven, Pam" 330c does not begin with D, however, the lower-level element 330, "Duct Work," does begin with D, so it is included in the filtered list 350. In addition, note that Duncan, Dave 330d is emphasized in the list (by highlighting). In this embodiment, the alphabetically first element 330 of the highest-level is highlighted, as well as placed into the string input area 315.

If there had been no match for the character string input, the complete (unfiltered) list of elements 325 would expand. For example, for input of character string "bi" for the list of elements 325 shown in FIG. 3B, the (unfiltered) list of elements 325 expands as shown.

Figure 3E:
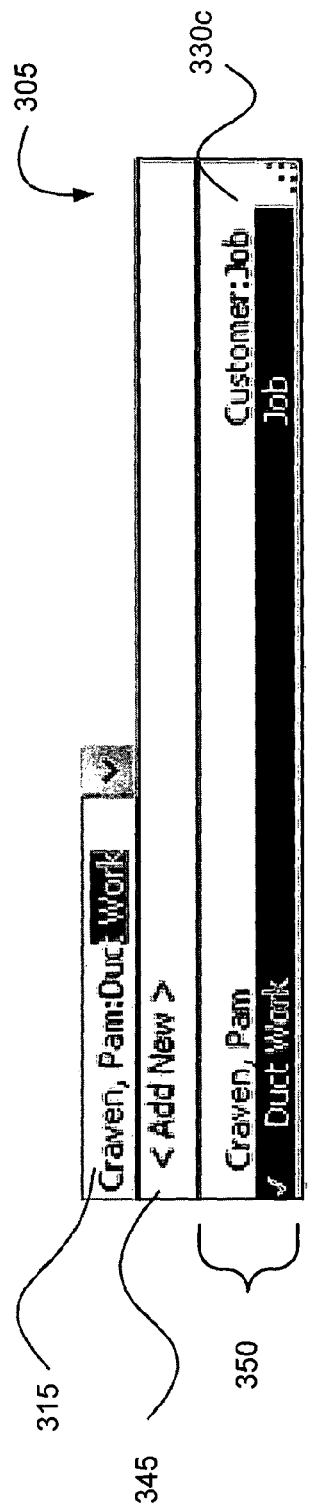
Figure 3F:
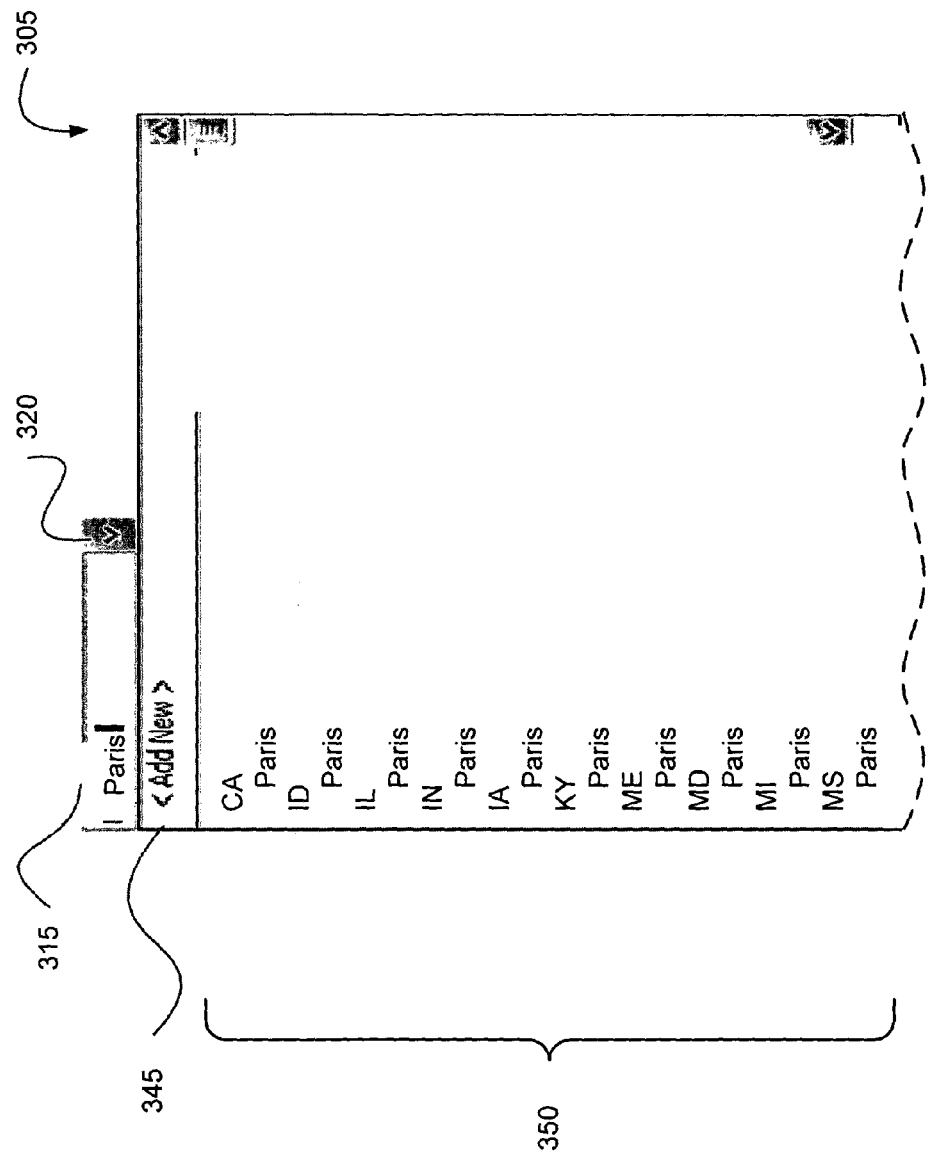

In one embodiment, when the user has input a single character, the filtered list of elements 350 automatically displays. In the example depicted in FIG. 3C, the user has typed only "D," so only elements 330 beginning with D are included in the filtered list of elements 350. When the user has input a second character, the filtered list of elements 350 automatically updates. In the example depicted in FIG. 3D, the user has typed "Du," so only elements 330 beginning with Du are included in the filtered list of elements 350. When the user has input a third character, the filtered list 350 again updates, yielding a single matching element 330, "Duct Work," as shown in FIG. 3E. Thus, the filtered list of elements 350 changes as the string entered in the string input area 315 changes. Once the list has been narrowed, the user can select the element 330 automatically pre-filled in the string input area 315, if it is the desired element 330, or can select the desired element 330 from the filtered list 350, e.g., by clicking or cursoring down.

Figure 4A:
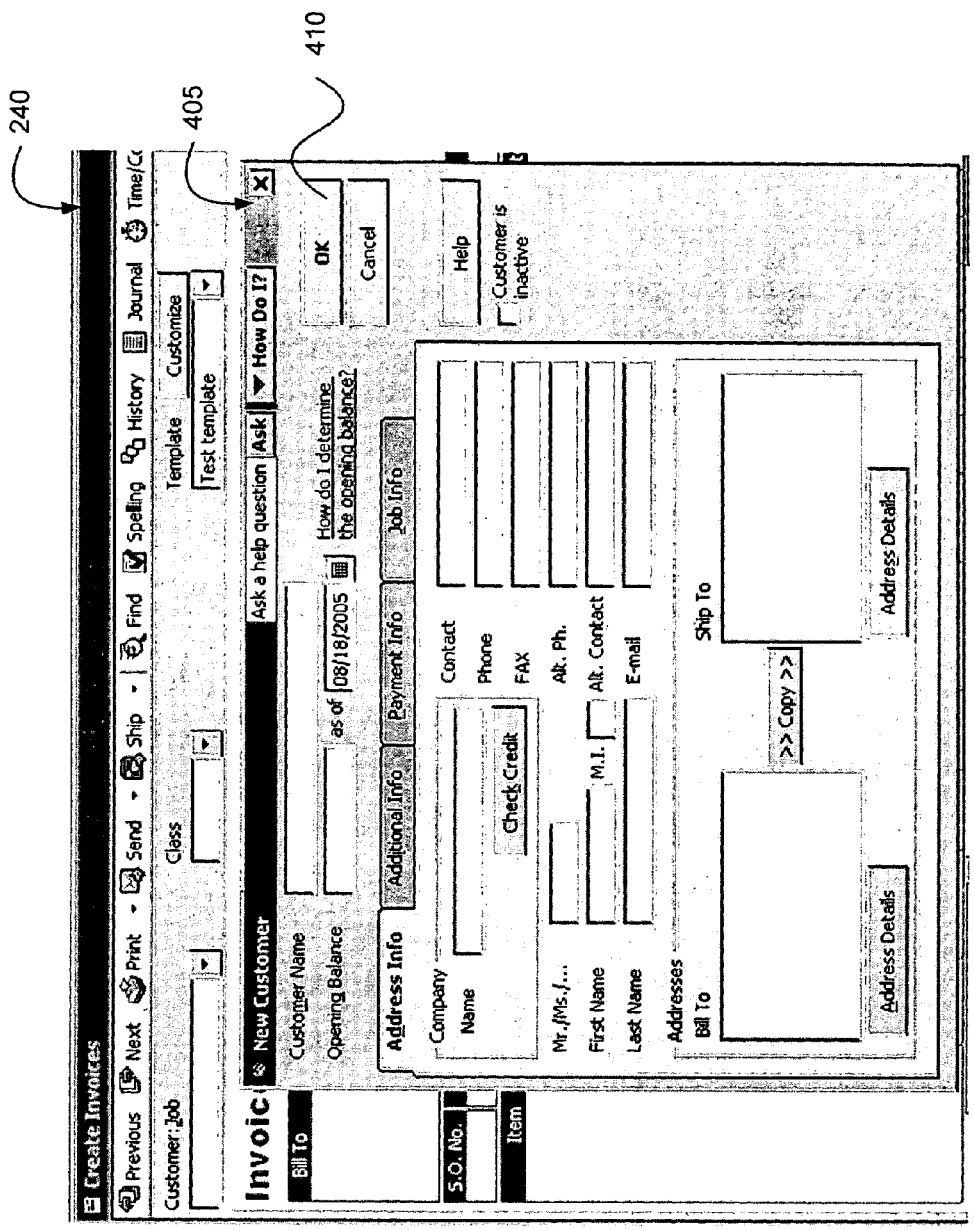
FIG. 4A illustrates a new customer screen of a user interface for creating/adding an element to a list according to the present invention.
Figure 4B:
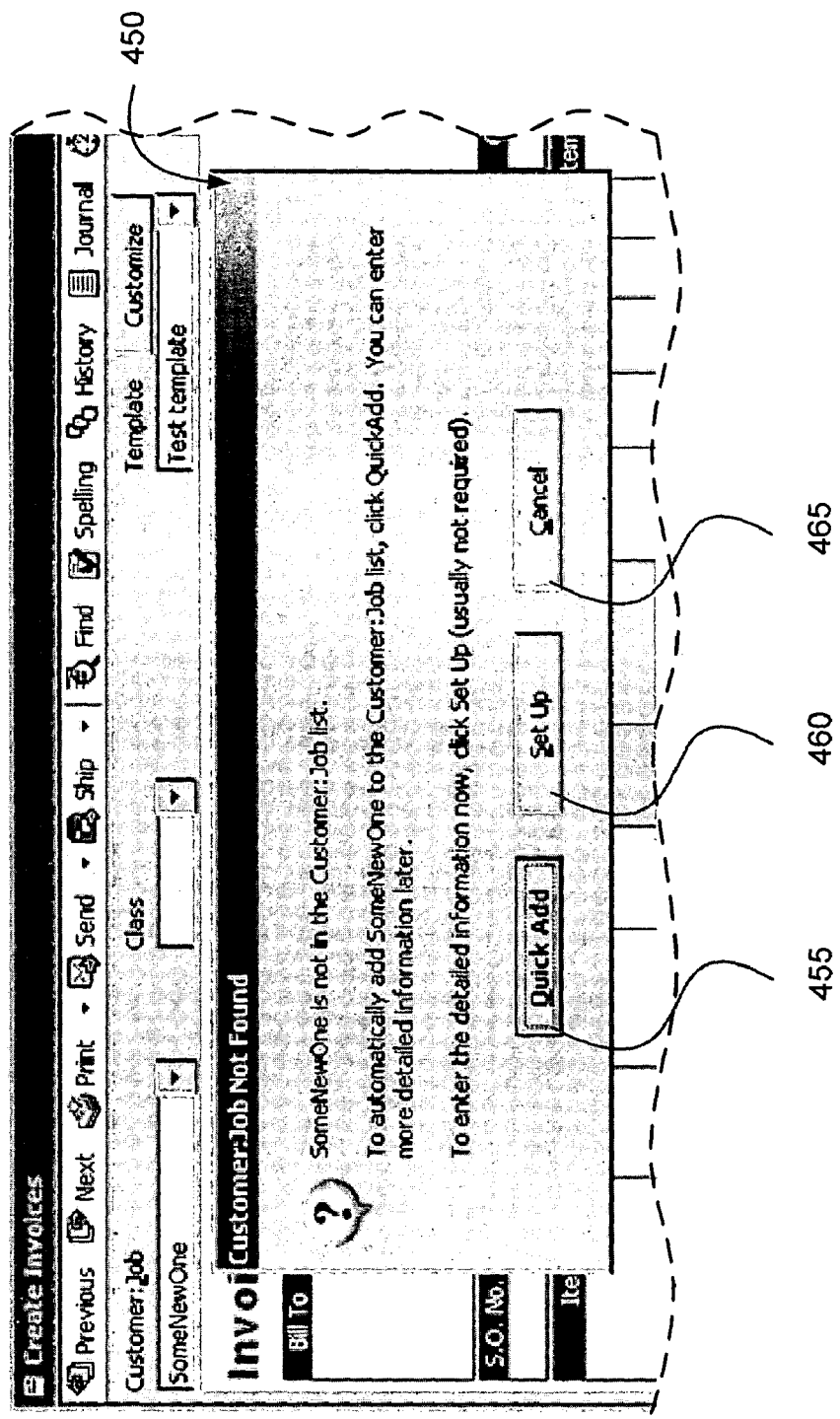
FIG. 4B illustrates a dialog box of a user interface for adding a new element to a list according to the present invention.

If the list of elements does not contain the element 330 desired, the user has two options for inputting that information. The user can select the add element selector 345. Upon clicking the add element selector 345, a data entry screen pops up, such as the new customer screen 405 shown in FIG. 4A, allowing the user to enter new information, in this example a new customer. When the user has finished entering new information, clicking the OK button 410 closes the screen 405 and the newly added element 330 is included in the list of elements 325. Alternatively, the user can type a new element in the string input area 315 and exit the string input area 315, e.g., by tabbing or clicking elsewhere. Upon doing so, a quick add dialog box 450 pops up, as shown in FIG. 4B. The quick add dialog box 450 includes a quick add button 455, set up button 460, and cancel button 465. The quick add button 455 allows the user to add the typed element 330 to the list without any additional data entry. The set up button 460 brings the user to a data entry screen, e.g., the new customer screen 405 of FIG. 4A, to enter more complete information. The cancel button 465 allows the user to cancel out of the dialog box 450, e.g., if the user does not wish to enter a new element 330.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for selecting elements, comprising:
   receiving input of a first character string (CS);
   obtaining, using a processor, a list comprising a first high level (HL) element and a first plurality of low level (LL) elements, wherein each of the first plurality of LL elements is a type of the first HL element;
   identifying, in the list, an element of the first plurality of LL elements by matching the first CS to a portion of the element of the first plurality of LL elements, wherein the element of the first plurality of LL elements includes the first CS;
   generating, using the processor, a filtered list comprising the first HL element and the first plurality of LL elements, wherein at least one of the first plurality of LL elements does not include the first CS;
   obtaining a second CS after generating the filtered list, wherein the second CS is distinct from the first CS;
   searching the list using a concatenation of the first CS and the second CS as a search criterion;
   generating an updated filtered list comprising a second HL element and a second plurality of LL elements, in response to searching the list using the concatenation, wherein the second HL element comprises a concatenation of the first CS and the second CS, and wherein at least one of the second plurality of LL elements does not include the concatenation;
   obtaining a third CS after generating the updated filtered list, wherein the third CS is distinct from the first CS and the second CS;

searching the list using a second concatenation of the first CS, the second CS, and the third CS as a search criterion;

determining that there is no match for the second concatenation; and adding a new LL element to the list of elements after determining that there is no match for the second concatenation.

2. A computer-implemented method for selecting elements, comprising:

receiving input of a first character string (CS);

obtaining, using a processor, a list comprising a first high level (HL) element and a first plurality of low level (LL) elements, wherein each of the first plurality of LL elements is a type of the first HL element;

matching the first CS with a portion of the first HL element in the list, wherein the first HL element includes the first CS;

generating, using the processor, a filtered list comprising the first HL element and the first plurality of LL elements, wherein at least one of the first plurality of LL elements does not include the first CS;

obtaining a second CS after generating the filtered list, wherein the second CS is distinct from the first CS;

searching the list using a concatenation of the first CS and the second CS as a search criterion;

generating an updated filtered list comprising a second HL element and a second plurality of LL elements, in response to searching the list using the concatenation, wherein the second HL element comprises a concatenation of the first CS and the second CS, and wherein at least one of the second plurality of LL elements does not include the concatenation;

obtaining a third CS after generating the updated filtered list, wherein the third CS is distinct from the first CS and the second CS;

searching the list using a second concatenation of the first CS, the second CS, and the third CS as a search criterion;

determining that there is no match for the second concatenation; and adding a new LL element to the list of elements after determining that there is no match for the second concatenation.

3. A computer readable storage medium storing instructions for selecting elements, the instructions comprising functionality to:

receive input of a first character string (CS);

obtain a list comprising a first high level (HL) element and a first plurality of low level (LL) elements, wherein each of the first plurality of LL elements is a type of the first HL element;

identify, in the list, an element of the first plurality of LL elements by matching the first CS with a portion of the element of the first plurality of LL elements, wherein the element includes the first CS;

generate, in response to identifying the element, a filtered list comprising the first HL element and the first plurality of LL elements, wherein at least one of the first plurality of LL elements does not include the first CS;

obtain a second CS after generating the filtered list, wherein the second CS is distinct from the first CS;

search the list using a concatenation of the first CS and the second CS as a search criterion;

generate an updated filtered list comprising a second HL element and a second plurality of LL elements, in response to searching the list using the concatenation, wherein the second HL element comprises a concatenation of the first CS and the second CS, and wherein at least one of the second plurality of LL elements does not include the concatenation;

obtain a third CS after generating the updated filtered list, wherein the third CS is distinct from the first CS and the second CS;

search the list using a second concatenation of the first CS, the second CS, and the third CS as a search criterion;

determine that there is no match for the second concatenation; and add a new LL element to the list of elements after determining that there is no match for the second concatenation.

4. A computer readable storage medium storing instructions for selecting elements, the instructions comprising functionality to:

receive input of a first character sting (CS);

obtain a list comprising a first high level (HL) element and a first plurality of low level (LL) elements, wherein each of the first plurality of LL elements is a type of the first HL element;

matching the first CS to a portion of the first HL element, wherein the first HL element includes the first CS;

generate, in response to matching, a filtered list comprising the first HL element and the first plurality of LL elements, wherein at least one of the first plurality of LL elements does not include the first CS;

obtain a second CS after generating the filtered list, wherein the second CS is distinct from the first CS;

search the list using a concatenation of the first CS and the second CS as a search criterion;

generate an updated filtered list comprising a second HL element and a second plurality of LL elements, in response to searching the list using the concatenation, wherein the second HL element comprises a concatenation of the first CS and the second CS, and wherein at least one of the second plurality of LL elements does not include the concatenation;

obtain a third CS after generating the updated filtered list, wherein the third CS is distinct from the first CS and the second CS;

search the list using a second concatenation of the first CS, the second CS, and the third CS as a search criterion;

determine that there is no match for the second concatenation; and add a new LL element to the list of elements after determining that there is no match for the second concatenation.

5. An apparatus for selecting elements, comprising:

a processor;

means, executing on the processor, for receiving input of a character sting (CS);

means, executing on the processor, for obtaining a list comprising a first high level (HL) element, a second HL element, a first plurality of low level (LL) elements, and a second plurality of LL elements, wherein each of the first plurality of LL elements is a type of the first HL element, and wherein each of the second plurality of LL elements is a type of the second HL element;

means, executing on the processor, for matching the CS with a portion of an element of the first plurality of LL elements and a portion of the second HL element, wherein the element of the first plurality of LL elements and the second HL element comprise the CS;

means, executing on the processor, for generating, in response to the matching, a filtered list comprising the first HL element, the second HL element, the first plurality of LL elements, and the second plurality of LL elements, wherein the first HL element does not include the CS, wherein at least one of the first plurality of LL elements does not include the CS, and wherein at least one of the second plurality of LL elements does not include the CS;

means, executing on the processor, for obtaining a second CS after generating the filtered list, wherein the second CS is distinct from the first CS;

means, executing on the processor, for searching the list using a concatenation of the first CS and the second CS as a search criterion;

means, executing on the processor, for generating an updated filtered list comprising a second HL element and a second plurality of LL elements, in response to searching the list using the concatenation, wherein the second HL element comprises a concatenation of the first CS and the second CS, and wherein at least one of the second plurality of LL elements does not include the concatenation;

means, executing on the processor, for obtaining a third CS after generating the updated filtered list, wherein the third CS is distinct from the first CS and the second CS;

means, executing on the processor, for searching the list using a second concatenation of the first CS, the second CS, and the third CS as a search criterion;

means, executing on the processor, for determining that there is no match for the second concatenation; and means, executing on the processor, for adding a new LL element to the list of elements after determining that there is no match for the second concatenation.

6. A system for selecting elements, comprising:

a processor; and an application, executing on the processor and comprising:

a string input area for receiving input of a first character string (CS), a second CS, and a third CS, wherein the second CS is distinct from the first CS, and wherein the third CS is distinct from the first CS and the second CS;

a drop-down list comprising a first high level (HL) element and a first plurality of low level (LL) elements, wherein each of the first plurality of LL elements is a type of the HL element;

a filtered list generated after searching the drop-down list and comprising the first high level (HL) element and the first plurality of LL elements, wherein searching the drop-down list comprises matching the first (CS) to a portion of an element in the first plurality of LL elements, wherein the element in the first plurality of LL elements includes the first CS, and wherein the at least one of the plurality of first LL elements does not include the first CS;

an updated filtered list comprising a second HL element and a second plurality of LL elements, wherein the second HL element comprises a concatenation of the first CS and the second CS, and wherein at least one of the second plurality of LL elements does not include the concatenation; and a new LL element added to the list of elements after determining that there is no match for a second concatenation of the first CS, the second CS, and the third CS.

7. The computer-implemented method of claim 1, wherein the first HL element does not include the first CS.

8. The computer-implemented method of claim 1, further comprising:

identifying, in the list, a second HL element by matching the first CS to a portion of the second HL element, wherein the second HL element comprises the first CS; and adding the second HL element to the filtered list.

9. The computer-implemented method of claim 8, further comprising:

adding a second plurality of LL elements to the filtered list, wherein each of the second plurality of LL elements is a type of the second HL element, and wherein at least one of the second plurality of LL elements does not include the first CS.

10. The computer-implemented method of claim 1, further comprising:

identifying, in the list, an element of a second plurality of LL elements by matching the first CS to a portion of the element of the second plurality of LL elements, adding the second plurality of LL elements to the filtered list, wherein at least one of the second plurality of LL elements does not include the first CS.

11. The computer-implemented method of claim 1, wherein the list and the filtered list are graphical user interface components of a financial software application.

12. The computer-implemented method of claim 1, wherein each of the first plurality of LL elements comprises a first name and a last name.

13. The computer-implemented method of claim 2, wherein at least one of the first plurality of LL elements comprises the CS.

14. The computer-implemented method of claim 2, further comprising:

identifying, in the list, an element of a second plurality of LL elements by matching the first CS to a portion of the element of the second plurality of LL elements, wherein the element of the second plurality of LL elements comprises the first CS; and adding the second plurality of LL elements and a second HL element to the list, wherein each of the second plurality of LL elements is a type of the second HL element.

15. The computer-implement method of claim 14, wherein the second HL element does not include the first CS.

16. The computer-implemented method of claim 2, wherein the list and the filtered list are graphical user interface components of a financial software application.

17. The computer-implemented method of claim 2, wherein each of the first plurality of LL elements comprises a first name and a last name.

18. The computer readable storage medium of claim 3, wherein the first HL element does not include the first CS.

19. The computer readable storage medium of claim 3, wherein the instructions further comprise functionality to:

identify, in the list, a second HL element by matching the first CS to a portion of the second HL element, wherein the second HL element comprises the first CS; and add the second HL element to the filtered list.

20. The computer readable storage medium of claim 3, the instructions further comprising functionality to:

add a second plurality of LL elements to the filtered list, wherein each of the second plurality of LL elements is a type of the second HL element, and wherein at least one of the second plurality of LL elements does not include the first CS.

21. The computer readable storage medium of claim 4, the instructions further comprising functionality to:
    identify, in the list, an element of a second plurality of LL elements by matching the first CS to a portion of the element of the second plurality of LL elements, wherein the element of the second plurality of LL elements comprises the first CS; and
    add the second plurality of LL elements and a second HL element to the list, wherein each of the second plurality of LL elements is a type of the second HL element.

22. The apparatus of claim 5, wherein the list and the filtered list are graphical user interface components of a financial software application.

23. The apparatus of claim 5, wherein each of the first plurality of LL elements comprises a first name and a last name.

24. The system of claim 6, wherein the string input area, the drop-down list, and the filtered list are graphical user interface components of a financial software application.

25. The method of claim 1, wherein each of the first plurality of LL elements a member of a family hierarchy beneath the first HL element, and wherein the family hierarchy identifies a structural relationship between the first HL element and the first plurality of LL elements.

\* \* \* \* \*